Patented Jan. 22, 1924.

1,481,779

UNITED STATES PATENT OFFICE.

ERNEST A. WILDMAN, OF RICHMOND, INDIANA, ASSIGNOR TO SWAN-MYERS CO., OF INDIANAPOLIS, INDIANA, A CORPORATION OF INDIANA.

CALCIUM ORTHO-BENZYLOXYBENZOATE.

No Drawing.    Application filed April 18, 1921. Serial No. 462,381.

*To all whom it may concern:*

Be it known that I, ERNEST A. WILDMAN, a citizen of the United States, residing at Richmond, in the county of Wayne and State of Indiana, have invented new and useful Calcium Ortho-Benzyloxybenzoate, of which the following is a specification.

My invention relates to calcium ortho-benzyloxybenzoate, the calcium salt of ortho-benzyloxybenzoic acid, having the following formula:

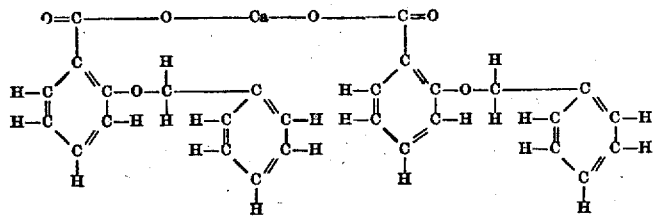

This may be considered as a derivative of salicylic acid, in which the hydrogen atoms of the carboxyl groups have been replaced by an atom of calcium, and the hydrogen atoms of the phenolic hydroxyl groups have been replaced by the benzyl radical; or as a derivative of the calcium salt of salicylic acid, in which the hydrogen atom of the phenolic hydroxyl group of each salicyl radical has been replaced by the benzyl radical.

It is the object of my invention to produce a readily administered water-soluble medicinal compound which has the desirable properties of the benzyl radical combined with those of the salicyl radical, and which at the same time is free or more nearly free from the objectionable features of the compounds at present used to obtain these medicinal effects, such as benzyl benzoate on the one hand and salicylic acid on the other hand; and which has a high acid-radical content, and can be obtained in solid form by evaporation of its water solution.

My present invention is directed specifically to the calcium salt of ortho-benzyloxybenzoic acid. This calcium salt, however, is included in the generic invention set forth in my co-pending application, Serial No. 644,459 filed June 9, 1923, which generic invention is directed to a number of salts of this acid.

This calcium salt is probably most conveniently prepared by using ortho-benzyloxybenzoic acid as the starting point, especially when the pure salt is desired; though this salt can be made without first making the acid as an isolated product.

A process of preparation of the acid, which process, however, is not part of the invention here claimed, is as follows: 23 parts by weight of metallic sodium are dissolved in about 400 parts of alcohol, 150 parts of methyl salicylate and 130 parts of benzyl chloride are added, and the mixture is boiled until, usually after about an hour, it is apparent from precipitation of sodium chloride that the reaction is complete. The alcohol is then distilled off (and preferably recovered) from the remaining oil, and this remainder is shaken with water to remove the sodium chloride and any saponified material. After such removal, the remaining oily material is then boiled with 45 parts of sodium hydroxide in about 300 parts of water until the mixture becomes homogeneous due to saponification of the oil. The resulting solution, of sodium ortho-benzyloxybenzoate, is acidified with 55 parts of sulphuric acid, and the precipitated oil is collected and crystallized from its solution in a suitable solvent, such as carbon tetrachloride or alcohol. This product, which is ortho-benzyloxybenzoic acid, is a crystalline white powder, odorless and substantially tasteless (though some palates get a slight sharp burning taste), insoluble in water, and easily soluble in dilute alkalis and the most organic solvents. Its melting point is 75° C. Its chemical structure is shown by the formula given above, save that two hydrogen atoms are substituted for the calcium atom, to produce two molecules of the acid.

Typical methods for the preparation of the calcium salt from this acid are as follows:

Method A: Two molecular proportions of ortho-benzyloxybenzoic acid and one molecular proportion of powdered calcium carbonate are boiled together in about twenty parts of water until the evolution of carbon dioxide has ceased. The solution is then cooled, and the crystalline precipitate, which is the calcium salt, is filtered off and washed with a little cold water.

Method B: The calcium salt may be prepared from the sodium salt, which is included in the subject-matter of my aforesaid co-pending application. If desired, this may be done without first making the acid, for in the process of making the acid the sodium salt is first made, as in such process of making the acid the solution which exists prior to the acidification with sulphuric acid is of the sodium salt—sodium ortho-benzyloxybenzoate. Ordinarily, however, this solution contains other materials as impurities, so that the sodium salt is ordinarily not obtained in a pure state; and in consequence the calcium salt prepared from this solution may not always be of the desired purity. If a higher purity is necessary, the process of making the acid from this first solution of the sodium salt is completed in the manner above described; and then two molecular proportions of such acid are boiled with a solution of one molecular proportion of sodium carbonate in water. Within a few minutes the mixture becomes a clear solution of the sodium salt, which may be obtained in solid form by evaporating to dryness on a water bath. The calcium salt may be made from the sodium salt, either this purified sodium salt, or perhaps the less pure sodium salt obtained in the process of making the acid, as follows: To a 10% solution of the sodium salt (sodium ortho-benzyloxybenzoate) in water there is added an excess of a 40% solution of calcium chloride in water. The calcium ortho-benzyloxybenzoate crystallizes out, and is filtered off and washed with cold water.

This calcium salt (calcium ortho-benzyloxybenzoate) is a substantially white powder, sparingly soluble in water—in about 90 parts of water at 20° C. It has an acid-radical content of about 92%. It is obtainable in solid form by evaporation of its water solution. It does not have its solubility materially increased by the addition of ammonia.

The foregoing processes of preparation are given merely by way of example, and my invention is not limited to products obtained by the processes given.

I claim as my invention:

The calcium salt of ortho-benzyl-oxybenzoic acid.

In witness whereof, I have hereunto set my hand at Champaign, Illinois, this 12th day of April, A. D. one thousand nine hundred and twenty-one.

ERNEST A. WILDMAN.